Sept. 23, 1952  G. R. EGO  2,611,301
DIRECT MOUNTED TWO-WAY PLOW
Filed July 8, 1948  5 Sheets-Sheet 1

INVENTOR.
GEORGE ROSS EGO
BY
ATTORNEY

Sept. 23, 1952 G. R. EGO 2,611,301
DIRECT MOUNTED TWO-WAY PLOW
Filed July 8, 1948 5 Sheets-Sheet 2
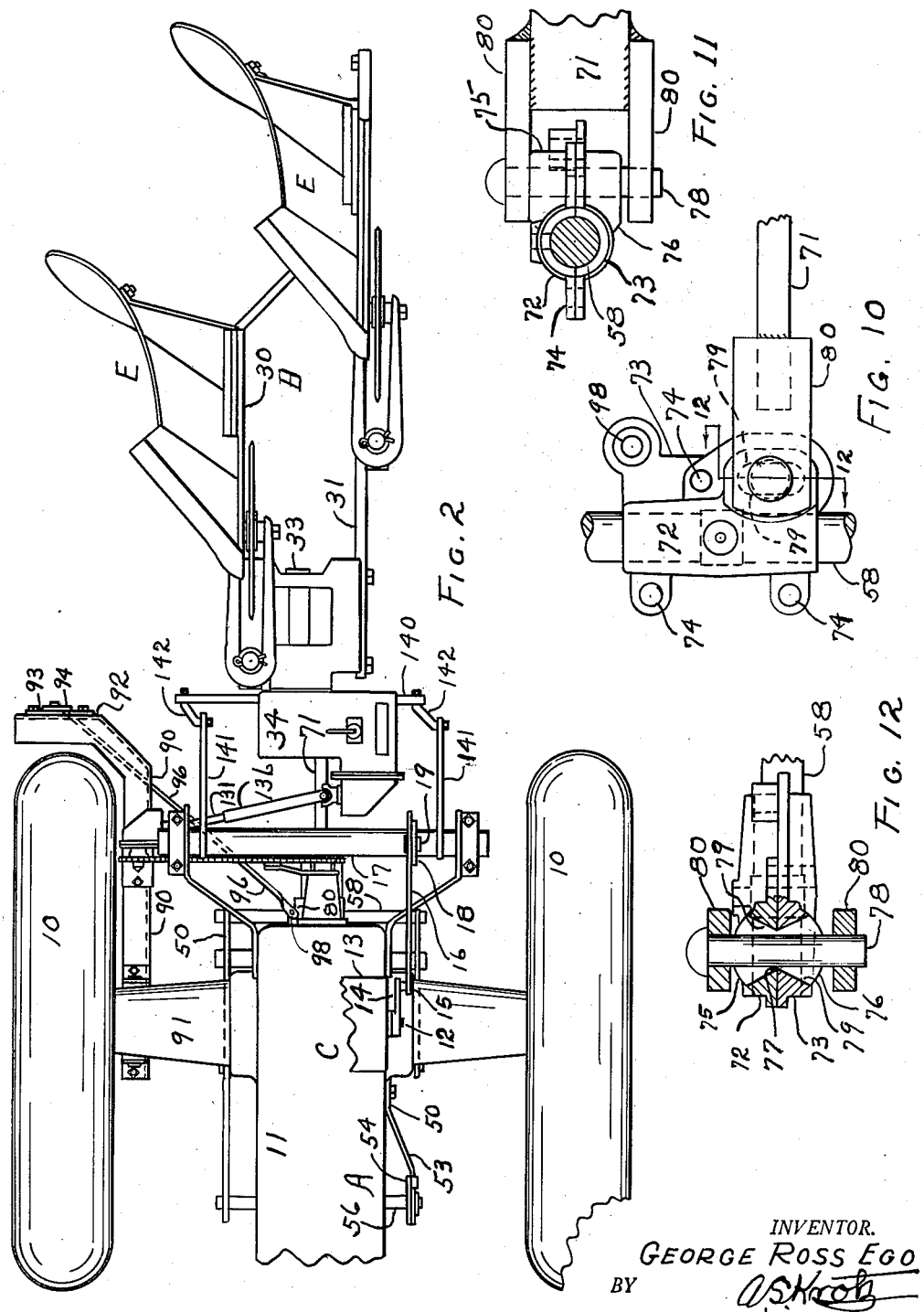
INVENTOR.
GEORGE ROSS EGO
BY
ATTORNEY

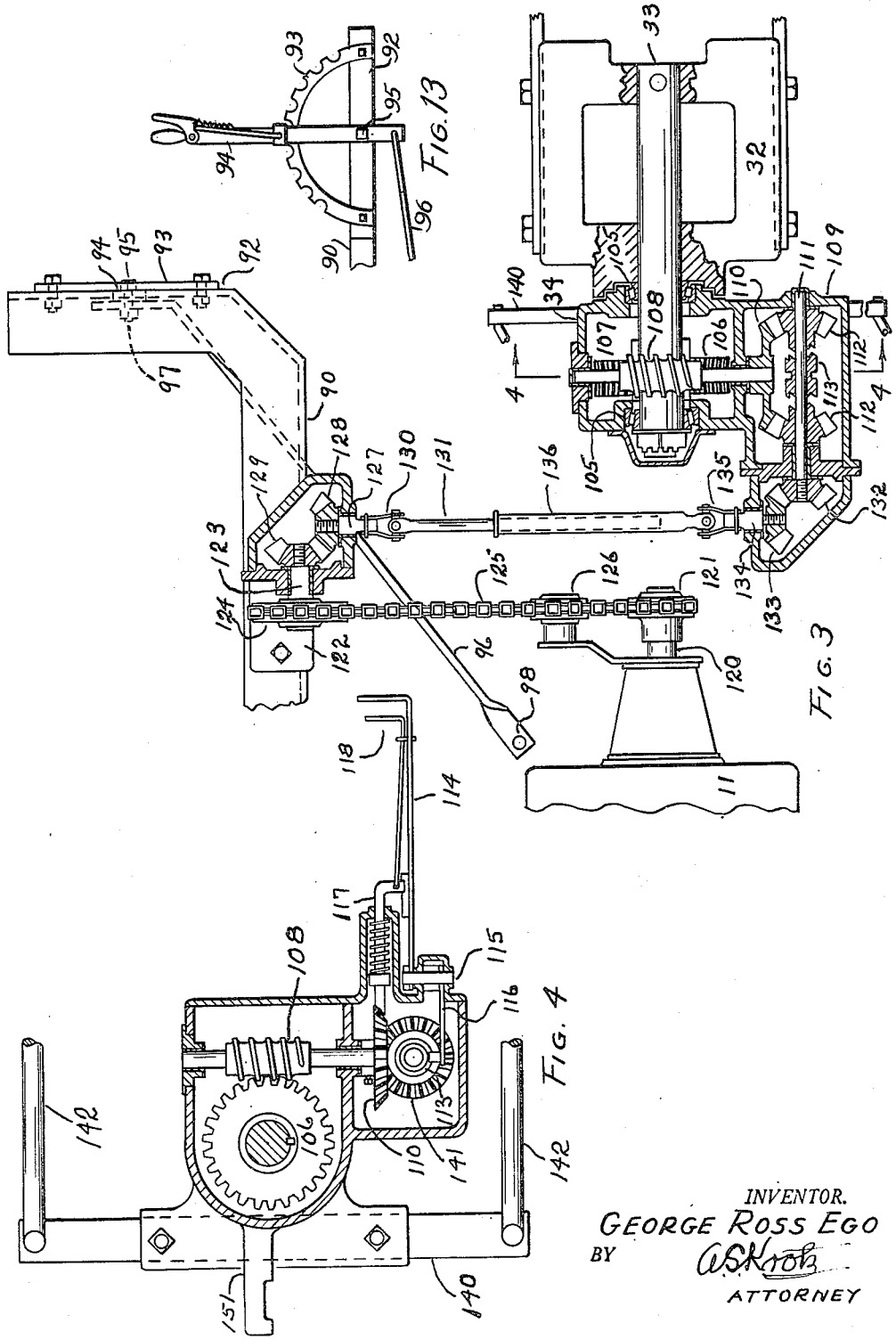

Sept. 23, 1952           G. R. EGO           2,611,301
DIRECT MOUNTED TWO-WAY PLOW
Filed July 8, 1948                       5 Sheets—Sheet 4
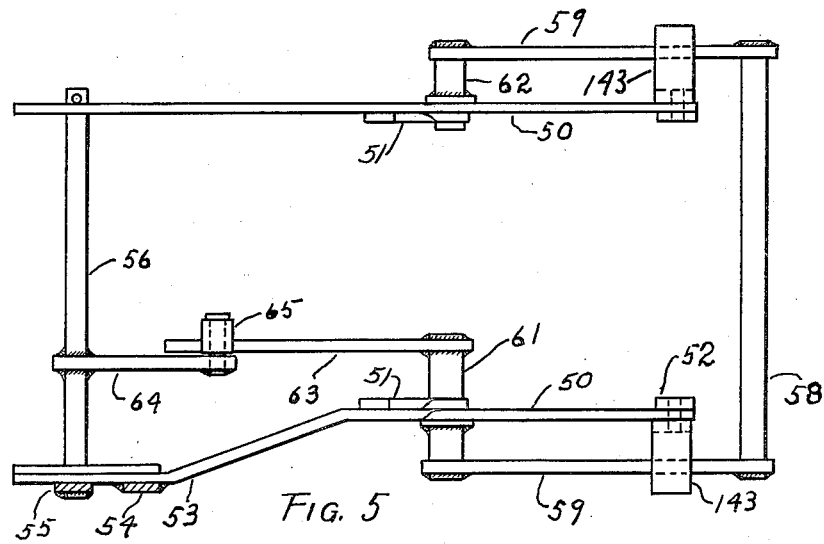
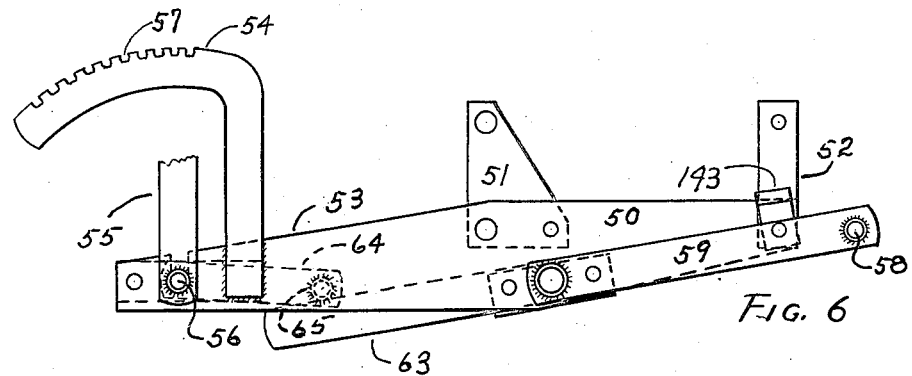
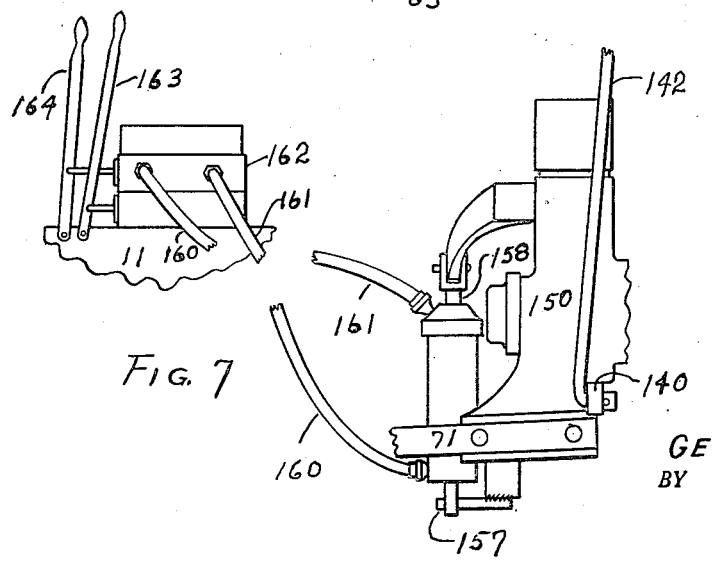
INVENTOR.
GEORGE ROSS EGO
BY
ATTORNEY

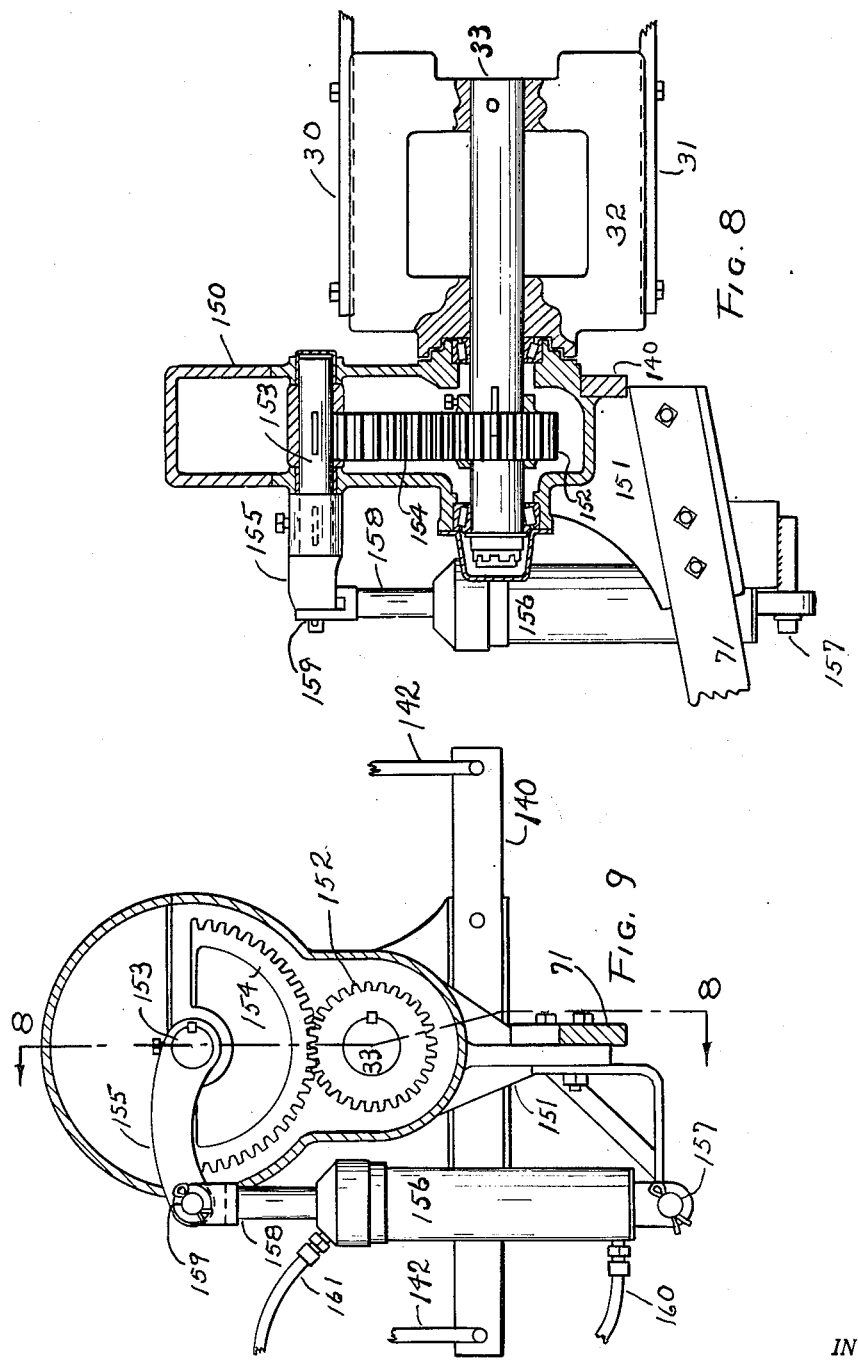

Patented Sept. 23, 1952

2,611,301

UNITED STATES PATENT OFFICE 2,611,301

DIRECT MOUNTED TWO-WAY PLOW

George Ross Ego, Brantford, Ontario, Canada, assignor to Massey-Harris Co., Ltd., Brantford, Ontario, Canada, a corporation of Canada Application July 8, 1948, Serial No. 37,593

4 Claims. (Cl. 97—26)

The present invention relates to a two way plow adapted to be directly and easily attached to a tractor and having means for full control by the operator comparable to the control of a one way directly mounted plow.

The principal object of the present invention is to rotatably mount the forward end of the plow frame in its connection to the tractor, whereby the plow frame may be turned 180 degrees more or less so when, for example, one or more of the plow bottoms are in an operating position the other plow bottom or bottoms will be directly above them or vice versa.

An important object of the present invention is to provide means for controlling the level of the plows by the same means used for turning the plows.

A further object of the present invention is to provide a depth control lever within easy reach of the tractor operator, with means whereby the depth of the plow may be controlled in cooperation with the rear end of the land sides or by the use of a rear furrow wheel independent of the plow lifting means.

An object of the present invention is to provide a simple connection to the power lift of the tractor for raising and lowering the plow and having means whereby the power lift does not interfere with the plow depth controlling means.

Other objects of the present invention are to provide convenient means for shifting transversely the plow hitch member and having means whereby the rear end of the plow is left free at all times to swing sidewise.

Another object of the present invention is to provide a novel, strong and simple plow frame structure on which the plow bottoms are mounted.

To these and other useful ends my invention consists of parts, combinations of parts or their equivalents and mode of operation as hereinafter described and claimed and shown in the accompanying drawings in which:

Fig. 2 is a top view of the device as shown in Figure 1 with the plow bottoms in a position for turning right hand furrows.

Fig. 3 is a detail view of a fraction of the device illustrating the means for turning the plows by the power take off shaft.

Fig. 4 is a sectional view taken on line 4—4 of Figure 3.

Figs. 5 and 6 illustrate the bail supporting means and the means for controlling the depth of the plow.

Fig. 7 illustrates a modification, wherein the plows are turned for right or left hand furrows, hydraulically.

Fig. 8 is a view of the hydraulic means for turning the plows, the housing being sectioned on lines 8—8 of Figure 9.

Fig. 9 is a front elevational view of the device shown in Figures 7 and 8, the front of the housing being cut away.

Fig. 10 is a top view of the housing connection to the bail showing a fraction of the hitch member.

Fig. 11 is an end view of the device as shown in Figure 10.

Fig. 12 is a partially sectioned rear view of the device as shown in Figures 10 and 11 taken on line 12—12 of Figure 10.

Figure 1:
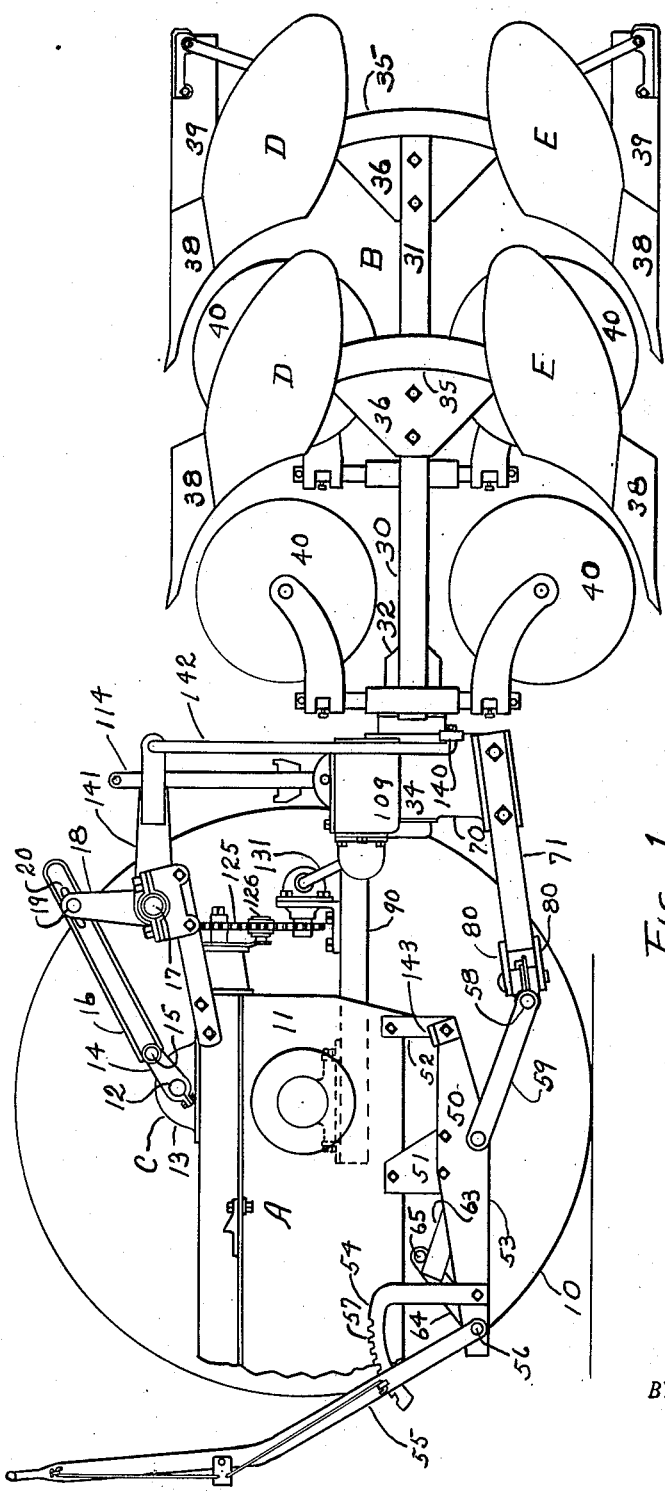
Fig. 1 is a side elevational view of a fraction of a tractor and of my device attached thereto with two of the plow bottoms in an operating position and for turning left hand furrows.

Fig. 13 is a rear view of a fraction of member 92 as shown in Figure 2 with lever 94 in a vertical position and in rear of member 92.

As thus illustrated, the tractor is designated by reference character A. The plow structure in its entirety is designated by reference character B. Tractor A may be of any conventional type having rear ground wheels 10—10 and a tractor frame 11, the tractor having mounted thereon a power lift which in its entirety is designated by reference character C. This power lift may be operated hydraulically or by means of a half turn clutch type mechanical lift as shown in the drawings, having a shaft 12 which protrudes through a housing 13 and having rigidly mounted thereon a crank 14 with a crank pin 15, the crank pin being connected to the forward end of a connecting bar 16.

I rotatably mount a shaft 17 on the rear end of the tractor frame as illustrated, this shaft having rigidly connected thereto an arm 18. Arm 18 has a pin 19 which extends through a slot 20 in member 16. Suitable controlling means are provided for power lift C, whereby shaft 17 may be oscillated for raising and lowering the plows, slot 20 being suitably positioned and having a length, whereby when the plows are moved in the operating position by crank 14, the slot will permit adjusting the depth of the plow manually as will hereinafter appear.

Structure B comprises generally two beams 30 and 31, the forward ends of the beams being secured to opposite sides of a head 32, the head having secured thereto a shaft 33 which extends through a housing or bracket 34, the purpose of which will hereinafter appear.

Transverse arms 35—35 are secured to the rear end of beam 31 and to beam 30 as illustrated by means of gusset plates 36 which are suitably secured to the arms and beams.

I mount right hand plow bottoms D on adjacent ends of members 35 and left hand plow bottoms E on the other ends of members 35. These plow bottoms being preferably conventional in shape, have shares 38. The front bottoms have short land sides (not shown) and the rear bottoms have long land sides 39—39. These long land sides act to take the side thrust of the plow and to assist in controlling the depth plowed. It will be understood that I may design my plow frame B for one right hand plow and one left hand plow, or discs may be used for turning the furrows.

I provide preferably a coulter 40 for each plow bottom D and E and mount them on the beams in the usual manner. Thus I show a gang plow for plowing right hand furrows on one side of the beams and a gang plow for plowing left hand furrows on the other side of the beams so that when structure B is in the position shown in Figure 2, the right hand tractor wheel 10 may travel in the last furrow plowed and the front plow bottom of member B will turn its furrow and throw it into the last furrow plowed and the rear plow bottom will turn its furrow into the furrow formed by the front plow bottom.

It will be understood that the right hand plow bottoms that are in operating position in Figure 2 are not shown because they are directly under the two plow bottoms E. It will be observed by scrutinizing Figure 2, that when member B is turned one half turn, plow bottom E shown in Figure 2 will then be in an operating position to throw a left hand furrow as shown in Figure 1.

Thus I have shown what I term a turnover plow. The means for accomplishing this turnover operation and for leveling the furrows plowed will hereinafter appear.

I will now describe the connections between member 34 and the frame of the tractor. I mount on opposite sides of the tractor frame 11, bars 50—50 (see Figures 1, 2 and 5) by means of brackets 51—51 and 52—52 (see Figure 1), the left hand member 50 having an extension 53 which carries a sector 54. A depth lever 55 is secured to a shaft 56 having suitable latches with hand operating means for engaging the teeth 57 in sector 54 for controlling the depth plowed as follows:

A bail 58 has end bars 59—59, the bail being free to pivot on tubes 61 and 62, these members being secured to members 59 and rotatably mounted in member 50. Structure 61 has secured thereto a forwardly extending arm 63. Shaft 56 is pivoted in the front ends of members 50 and 53 and having secured thereto an arm 64. A roller 65 is rotatably mounted on the free end of arm 64 and is adapted to contact the upper surface of arm 63 which is secured to tube 61. Thus lever 55 may be used to determine the lowest or working position of bail 58 or in other words the depth plowed.

I will now describe the connection between housing 34 and bail 58 and the manner of shifting this connection longitudinally on this bail. Housing 34 has a downwardly extending extension 70 to which a heavy hitch bar 71 is secured, the front end of which is attached to bail 58 as follows:

Brackets 72 and 73 (see Figures 10, 11 and 12) are loosely clamped on bail 58 by means of bolts as at 74 so the brackets are slidably and hingedly mounted on the bail. The rear left side of members 72 and 73 have projections 75 and 76, each having openings which register at 77 forming a free fit for a bolt 78 at this point. Openings 77 flare outwardly in a direction parallel to bail 58 as at 79—79. Bar 71 has secured thereto on its top and bottom edges plates 80—80 preferably by electric welding. Bolt 78 extends trough these plates. Bar 71 is connected to bail 58 by means of a universal joint, so called because the rear end of the bar may be swung vertically and sidewise in any direction. The universal joints hereinafter referred to in connection with power transmission have the same characteristics except they are adapted to transmit power from one shaft to another.

Thus it will be seen by scrutinizing Figures 10, 11 and 12, that structure B is hinged on bail 58 as an axis and that structure B may swing sidewise on bolt 78 as an axis and that structure B may tilt transversely for leveling the plows and also that the bracket formed by members 72 and 73 may be moved longitudinally on bail 58 in the following manner.

An arm 90 is rigidly secured to the right hand axle housing 91, its rear end 92 being extended outwardly and having mounted thereon a ratchet 93. A hand operated lever 94 is pivoted to member 92 as at 95, the lever extending a distance below this pivot and having hingedly secured thereto a link 96 as at 97, the link having a pivotal connection to bracket 72 as at 98. Thus by manipulating lever 94 brackets 72 and 73 may be moved to the right or left on bail 58 for controlling the width of the furrow cut by the front bottom of each pair of bottoms.

Generally bolt 78 will be held in a transverse central position with the tractor; however if it is necessary to move the bracket and this bolt to the right when plowing a right hand furrow it may be necessary to move this bolt to the left when plowing a left hand furrow. Lever 94 is within easy reach of the operator, therefore these operations are a comparatively simple matter.

I will now describe the means provided for turning structure B for plowing right and left hand furrows as illustrated in Figures 1, 2, 3 and 4.

Shaft 33 is rotatably mounted in housing 34 as at 105—105. A worm gear 106 is rigidly mounted on shaft 33 within the housing. A shaft 107 is rotatably mounted in the housing as illustrated and having a worm pinion 108 which meshes the teeth in worm gear 106, one end of shaft 107 protruding into a supplemental housing projection 109 and having mounted on its protruding end bevel gear 110.

Another shaft 111 is rotatably mounted in extension 109 and having rotatably mounted thereon bevel pinions 112—112 positioned to mesh bevel gear 110 as illustrated. The center portion of shaft 111 is splined and having mounted thereon a collar 113. The opposite ends of collar 113 and the inner ends of pinions 112 are toothed so either of the pinions may be locked to the shaft by moving collar 123 as far in either direction as it will go.

Thus while shaft 111 is adapted to turn in a certain direction collar 113 may be shifted so as to turn shaft 107 either clockwise or anti-clockwise and thus to turn structure B in either direction for plowing right or left hand furrows or for leveling the plows which are in an operating position. The means for shifting collar 113 comprises a suitably mounted lever 114 mounted so when the lever is moved forward, the collar will be shifted to the rear and when the lever is moved rearward the collar will be shifted forward. Thus while shaft 111 is in operation the operator can easily turn the plow bottom or bottoms for right or left hand plowing and level the plows that are in operation. Lever 114 is secured to a shaft 115, to the outer end of which an arm 116 is secured having at its lower end means for engaging collar 113. When the collar is in the position shown in Figure 3 the lever will be in neutral position. By moving the lever on shaft 115 as an axis the collar may be shifted for engagement with either pinion. I provide means for locking bevel gear 110 when the lever is in its neutral position as follows:

A plunger 117 is urged downward by a spring as illustrated, the lower end of member 117 being shaped to extend between two teeth. Lever 114 is provided with a hand operated latch 118 having a connection to member 117. Thus the gear can not turn when the lever is in a neutral position and when latch 118 is raised the lever can be moved in either direction for shifting collar 113 as already described.

I will now describe my means for driving shaft 111 from the power take off of the tractor. Power take off shaft 120 has secured thereto a chain sprocket 121. A housing bracket 122 is secured to member 90 (see Figure 3) and has rotatably mounted thereon a shaft 123 having a sprocket 124 mounted on its outer end. A chain 125 forms an operating connection between the two sprockets having a suitably mounted idler 126 with which to adjust the tautness of the chain. Another shaft 127 is rotatably mounted in housing 122 and having on its inner end a bevel pinion 128. Another bevel pinion 129 is secured to shaft 123 and is adapted to form an operating connection between shafts 123 and 127. On the outer end of shaft 127 I mount a universal joint 130 which forms an operating connection to a shaft 131.

A bevel gear 132 is mounted on the forward end of shaft 111 and a bevel pinion 133 is mounted on a shaft 134, the shaft being rotatably mounted in an extension to housing 109 as clearly indicated in Figure 3. On the outer end of shaft 134 I provide a universal joint 135 which is operatively connected to a square tube 136. Member 131 is square and adapted to be snugly, slidably mounted in the opening in tube 136.

Thus it will be seen that the spline between shaft 131 and tube 136 will permit the plow to be raised and lowered and moved to the right or left and that shaft 111 will receive power from the power take off shaft 120 and that the driver may manipulate lever 114 to turn structure B in housing 34 with shaft 33 acting as an axis.

Thus clearly the operator will have complete control over the position of structure B for turning it for right or left hand plowing and for leveling the plows when in operation.

Referring again to my preferred means for raising and lowering the plows by means of the power lift; I secure a transverse bar 140 to housing 34 and connect the ends of this bar to two spaced apart levers 141 (which are secured to shaft 17) by means of links 142. Thus when the power lift operates to lift the plows out of the ground the front end of structure B will be lifted first and because of the connection already described between housing extension 70 and bail 58 the bail will be lifted until arms 59 contact the under surface of stops 143, after which a further movement of the power lift will raise the rear end of structure B on bail 58 as an axis.

Thus the plow can be lifted and lowered at will by the operator in the usual way, points of the plow coming out of the ground first and entering the ground first and clearly after the plow is lowered to an operating position because of slot 20 the height of the bail will be controlled entirely by lever 55 which will control the depth plowed because of the action of land sides 39.

Thus I have fully described the preferred form of my device as illustrated in Figures 1, 2, 3, 4, 5, 6, 10, 11 and 12.

Other means may be provided for turning structure B on its axis. One such means is illustrated in Figures 7, 8 and 9, wherein a housing 150 has secured thereto the transverse bar 140 as in the other figures, this housing having a downwardly extending extension 151 which is connected to member 71 as illustrated and to rods 142 as and for the purpose specified. Shaft 33 has secured thereto a pinion 152. A shaft 153 is rotatably mounted in the upper end of housing 150 and has secured thereto a toothed sector 154. The forwardly protruding end of shaft 153 has secured thereto an arm 155.

I provide a double acting hydraulic ram designated by reference numeral 156 which is hinged at its lower end to member 151 as at 157 having a protruding piston 158 which is operatively connected to arm 155 as at 159. Thus hydraulic ram 156 may be used for turning structure B through its connection to shaft 33. Ram 156 is suitably connected to pipes 160 and 161. Pipes 160 and 161 lead to a valve box 162 having a lever 164 with which to determine the position of member B. Valve box 162 may have another valve and lever 163 for operating a hydraulic lift for the plow.

Thus it will be seen that the power connection specifically shown in Figures 3 and 4 may be dispensed with and the plows turned hydraulically by the means shown in Figures 7, 8 and 9. The valve box 162 having a suitable connection preferably to the hydraulic pump adapted to operate the power lift. Clearly other means than shown, may be used for turning the plows on shaft 33.

It will be seen that structure B may be easily disconnected from the tractor by removing pin 78, links 142 and 96, and in the design shown in Figures 7, 8 and 9 by disconnecting pipes 160, 161 and pin 76.

It will be seen that my device is simple, easily manufactured at reasonable cost and easily understood by the tractor operator; that I have provided what is generally called "finger tip control" over the attachment; that the plow is capable of doing excellent work under the control of a driver of ordinary intelligence and that the plow will turn a smooth furrow because it is not rigidly held to the frame of a tractor.

Clearly many minor detail changes may be made in the designs shown without departing from the spirit and scope of my invention as recited in the appended claims.

Having thus shown and described my invention, I claim:

1. In combination, a tractor having a power lift, a plow frame having plow bottoms attached to its rear end, said plow frame having a bracket secured to its forward end, two spaced apart forwardly extending arms rigidly secured together at their rear ends by a transverse bar forming a bail, said arms having their forward ends pivotally connected to the frame of the tractor, a hitch member secured at its rear end to said bracket, the forward end of said hitch member being rotatably secured to the transverse bar of said bail by means of a universal joint, the power lift of the tractor having connections to opposite sides of said bracket for raising and lowering the plow, a manually controlled depth lever adapted to determine the downward movement of the rear end of said bail, stops anchored to the tractor and positioned normally above and in the path of said bail, whereby when the rear end of the bail rises to a predetermined height, a further movement of the power lift will raise the rear end of the plow frame on said universal joint as an axis.

2. A device as recited in claim 1 wherein, a slidable connection between the power lift and plow providing means, whereby after the power lift has permitted the plow to lower by gravity to a depth determined by said depth lever, the power lift will continue for a distance and leave the plow depth wholly in control of said lever.

3. A device as recited in claim 1 wherein, said universal joint being slidably mounted on said bail bar, manually controlled means are mounted on said tractor having a connection to said universal joint, whereby the universal joint may be moved transverse to the direction of travel of the tractor.

4. A device as recited in claim 1 including, a manually operated lever adapted to optionally limit the downward movement of said bail, a sliding connection between said power lift and bracket adapted to permit free vertical movement of the rear end of said bail after said power lift has reached its extreme plow lowering position.

GEORGE ROSS EGO.

REFERENCES CITED

The following references are of record in the file of this patent:

UNITED STATES PATENTS

| Number | Name | Date |
|---|---|---|
| 1,148,088 | Heylman | July 27, 1915 |
| 1,191,143 | Amiot | July 18, 1916 |
| 1,800,284 | Delaye | Apr. 14, 1931 |
| 1,811,733 | Taylor | June 23, 1931 |
| 1,892,485 | Dufour | Dec. 27, 1932 |
| 2,079,595 | Collins | May 11, 1937 |
| 2,153,824 | Collins | Apr. 11, 1939 |
| 2,227,366 | Pridgen | Dec. 31, 1940 |
| 2,271,533 | Altgelt | Feb. 3, 1944 |
| 2,354,084 | Geraldson | July 18, 1944 |
| 2,364,367 | Janke | Dec. 5, 1944 |
| 2,420,530 | Evans | May 13, 1947 |

FOREIGN PATENTS

| Number | Country | Date |
|---|---|---|
| 22,498 | France | Feb. 8, 1921 |
| | (Addition to No. 461,267) | |
| 32,391 | France | June 28, 1927 |
| | (Addition to No. 614,838) | |
| 667,724 | France | June 24, 1929 |
| 682,483 | France | Feb. 17, 1930 |
| 163,473 | Great Britain | May 18, 1921 |
| 189,998 | Great Britain | Dec. 14, 1922 |